United States Patent
Su et al.

(10) Patent No.: US 9,806,918 B1
(45) Date of Patent: Oct. 31, 2017

(54) FAST DIRECT FEEDBACK CIRCUIT FOR DECISION FEEDBACK EQUALIZATION CORRECTION

(71) Applicant: Oracle International Corporation, Redwood City, CA (US)

(72) Inventors: Jianghui Su, San Jose, CA (US); Rajesh Kumar, Campbell, CA (US); Ranjan Vaish, Fremont, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

(21) Appl. No.: 15/181,167

(22) Filed: Jun. 13, 2016

(51) Int. Cl.
*H04L 25/03* (2006.01)
*H04L 25/02* (2006.01)
*H04B 1/16* (2006.01)

(52) U.S. Cl.
CPC ......... *H04L 25/03057* (2013.01); *H04B 1/16* (2013.01); *H04L 25/028* (2013.01); *H04L 25/03343* (2013.01)

(58) Field of Classification Search
CPC ............. H04L 25/03057; H04L 25/028; H04L 25/03343
See application file for complete search history.

(56) References Cited

U.S. PATENT DOCUMENTS

2003/0011847 A1* 1/2003 Dai .................. H04B 10/25133
  398/147
2005/0025228 A1* 2/2005 Stonick ............. H04L 25/03057
  375/232

* cited by examiner

*Primary Examiner* — Ross Varndell
(74) *Attorney, Agent, or Firm* — Marsh Fischmann & Breyfogle LLP; Daniel J. Sherwinter

(57) ABSTRACT

Embodiments include systems and methods for providing fast direct feedback to correct decision feedback equalization (DFE) in receiver circuits. Embodiments can provide direct feedback for DFE correction in a manner that is effective in high-speed data channels, while manifesting less latency, power consumption, and/or area than conventional DFE implementations. In some implementations, in each clock cycle (e.g., Tn), implementations can select (e.g., using a multiplexer) between a positive reference signal and a negative reference signal (e.g., both reference signals generated according to an inter-symbol interference magnitude for a data channel) according to a decision feedback signal from a previous clock cycle (Tn-1). The selected reference signal can be compared (e.g., in the same clock cycle Tn, using a comparator) with an input data signal to generated an updated decision feedback signal for a next clock cycle (e.g., Tn+1).

20 Claims, 8 Drawing Sheets

FAST DIRECT FEEDBACK CIRCUIT FOR DECISION FEEDBACK EQUALIZATION CORRECTION

FIELD

Embodiments relate generally to receiver circuits, and, more particularly, to techniques for providing fast direct feedback to correct decision feedback equalization in receiver circuits.

BACKGROUND

Receiver circuits, like serializer/deserializer (SERDES) circuits, are becoming ubiquitous in many computational environments. The SERDES can compress a relatively wide, parallel input into a relatively narrow, serial signal (e.g., a single "bit," differential signal) for communication over a serial bus. The serial bus switches at an appreciably higher rate than the parallel bus, and serial communication of the data stream tends to reduce cost, complexity, power, and board real estate relative to comparable parallel communications. As bus speeds increase, parallel communications manifest even higher power consumption and more issues relating to timing (e.g., skew mismatches and bit misalignment), making SERDES circuits even more attractive.

Often, the receiver circuits include various sub-circuits that attempt to reliably extract digital data from a received signal, which can involve sampling an analog signal to derive the digital bits (i.e., '1's and '0's). Accurate sampling can rely on determining where bit transitions occur and what bit value to record, even in context of noisy data, small signal levels, inter-symbol interference (ISI), and other difficult conditions. Over time, these and other conditions in the receiver circuits (e.g., and potentially also with their respective transmitter circuits, data channels, etc.) can contribute to bit errors in decoding the received signal, which can manifest as a degradation in link health. Accordingly, receiver circuits typically include various types of sub-circuits for reducing such bit errors, such as amplifiers, analog to digital conversion sub-circuits (e.g., data slicers), clock data recovery sub-circuits (e.g., error slicers), equalizer sub-circuits, etc. Some equalizer sub-circuits are decision feedback equalization (DFE) circuits, which can use a knowledge of previously received symbols to cancel ISI on the data channel. However, many conventional DFE approaches are too slow (e.g., have too much latency) and/or too expensive (e.g., consume too much power and/or area) to be implemented effectively for very high-speed links (e.g., at Gigabit-per-second and higher data rates).

BRIEF SUMMARY

Among other things, embodiments provide novel systems and methods for providing fast direct feedback to correct decision feedback equalization in receiver circuits. For example, a high-speed data channel includes a transmitter system on one side and a receiver system on the other side. The receiver system can include a decision feedback equalizer (DFE) circuit to adapt to artifacts of the data channels, for example, by compensating for inter-symbol interference. Embodiments can provide direct feedback for DFE correction in a manner that is effective in high-speed data channels, while manifesting less latency, power consumption, and/or area than conventional DFE implementations. In some implementations, in each clock cycle (e.g., Tn), implementations can select (e.g., using a multiplexer) between a positive reference signal and a negative reference signal (e.g., both reference signals generated according to a magnitude of signal interference from previous data after going through a channel) according to a decision feedback signal from a previous clock cycle (Tn−1). The selected reference signal can be compared (e.g., in the same clock cycle Tn, using a comparator) with an input data signal to generated an updated decision feedback signal for a next clock cycle (e.g., Tn+1).

According to one set of embodiments, a system is provided for decision feedback equalization. The system includes a multiplexer subsystem and a comparator subsystem. The multiplexer subsystem has: a positive reference signal input: a negative reference signal input: a decision feedback signal input; and a decision reference signal output. The decision reference signal output is a function of selecting between the positive reference signal input and the negative reference signal input as a function of the decision feedback signal input. The comparator subsystem has: a decision reference signal input coupled with the decision reference signal output; a data signal input; and a decision feedback signal output coupled with the decision feedback signal input. The decision feedback signal output is a function of comparing the data signal input and the decision reference signal input.

According to another set of embodiments, a method is provided for direct feedback-based correction of an input data signal. The method includes: receiving a positive reference signal and a negative reference signal, the positive and negative reference signals generated according to an inter-symbol interference (ISI) magnitude of a data channel: updating a decision reference signal by selecting, using a multiplexer, between the positive and negative reference signals as a function of a decision feedback signal; and updating the decision feedback signal as a function of comparing, using a comparator, an input data signal and the decision reference signal.

According to another set of embodiments, a system is provided for direct feedback-based correction of an input data signal. The system includes: means for updating a decision reference signal in a present unit time interval $UI_N$ by selecting between a positive reference signal and a negative reference signal as a function of a decision feedback signal updated in a preceding unit time interval $UI_{N-1}$, the positive and negative reference signals generated according to an ISI magnitude of a data channel; and means for updating the decision feedback signal in $UI_N$ as a function of comparing the decision reference signal and an input data signal received in $UI_N$.

BRIEF DESCRIPTION OF THE DRAWINGS

The present disclosure is described in conjunction with the appended figures.

Turning first to FIG. 1, a block diagram is shown of an illustrative communications environment, according to various embodiments.

Figure 1:
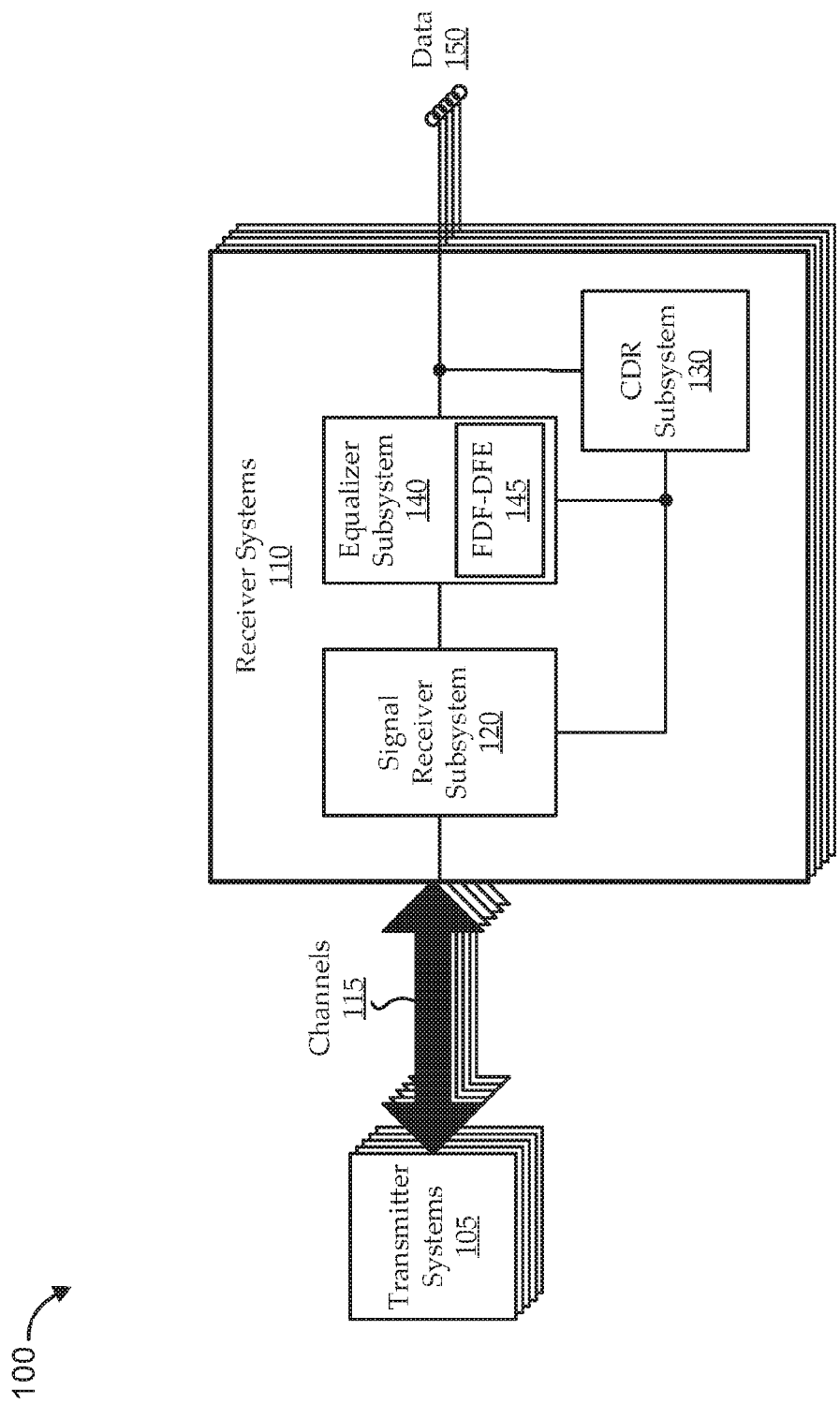

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In many typical input/output (I/O) systems (e.g., high-speed I/O circuitry of an integrated circuit (IC), microprocessor, or the like), data is communicated at high speeds over large numbers of data channels (e.g., thousands of data bus links). Reliable operation of such circuits can rely on reliable receipt of data over those data channels, even in context of noisy data, small signal levels, inter-symbol interference (ISI), and other difficult conditions. Accordingly, receiver circuits can typically include techniques for adapting to their respective channels, for example, by filtering the received signal to mitigate ISI.

Such filtering is often performed in high-speed serial links by decision feedback equalizers (DFE), which feedback information about previously received symbols to reduce ISI and achieve good bit error rates (BER). Typically, it is desirable for the DFE to base each next decision on calculation results from one or more immediately preceding bit calculations, which can depend on computing each decision within one unit interval (UI), such as one clock cycle. Increasing data rates can increase the difficulty of arriving at each decision within a single UI. As an example, one UI can be approximately 40 picoseconds in a 25 Gbps data link across all corner conditions.

Some embodiments described herein can provide direct feedback for DFE correction in a manner that is effective in high-speed data channels, while manifesting less latency, power consumption, and/or area than conventional DFE implementations. In some implementations, in each clock cycle (e.g., Tn), implementations can select (e.g., using a multiplexer) between a positive reference signal and a negative reference signal (e.g., both reference signals generated according to an ISI magnitude of a data channel, which can correspond to one or more DFE taps, referred to herein as "H1" . . . "Hn") according to a decision feedback signal from a previous clock cycle (Tn−1). The selected reference signal can be compared (e.g., in the same clock cycle Tn, using a comparator) with an input data signal to generated an updated decision feedback signal for a next clock cycle (e.g., Tn+1).

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention. While some embodiments are described with reference to SERDES circuits and/or I/O channels of ICs, similar techniques can be applied to any suitable types of receiver circuits in any suitable signal communications environment. Additionally, terms, like "channel," "link," "lane," and the like are all intended generally and interchangeably to refer to a data communication path.

Turning first to FIG. 1, a block diagram is shown of an illustrative communications environment 100, according to various embodiments. The communications environment 100 includes transmitter systems 105 and receiver systems 110 in communication via respective data channels 115. For example, a transmitter system 105 can include any suitable components, such as a driver, transmission clock generator, and/or other components for communicating data over its respective data channel 115. Each data channel 115 can be any parallel or serial, wired or wireless, or other suitable communications channel for carrying the data. Each receiver system 110 can be implemented in any suitable manner, for example as an integrated circuit (IC) that is part of and/or in communication with microprocessors, very-large-scale integration (VLSI) circuits, communication systems, storage area networks, local area networks, wide area networks, data centers, memory components, electronic devices, memory systems, and/or computer systems (such as multiple-core processor computer systems, computer systems that include components that communicate via capacitive proximity communication, computer systems that include components that communicate via optical proximity communication, etc.).

As illustrated, each receiver system 110 can include a signal receiver subsystem 120, a clock data recovery (CDR) subsystem 130, and an equalizer subsystem 140. While the receiver system 110 is illustrated as a simplified functional block diagram to avoid overcomplicating the description and figures, these simplifications should not be construed as limiting embodiments and implementations. Each receiver system 110 can include fewer or additional components, and the various functional blocks can each be implemented as one or more discrete components, combined with other functional blocks into a single component, implemented in any suitable architecture or arrangement, etc. For example, each receiver system 110 includes any suitable components for receiving a data signal from the data channel 115 and reliably outputting data 150 as desired by other systems or components in communication with the receiver system 110.

Each signal receiver subsystem 120 can include amplifiers, filters, analog-to-digital converters, parallel or serial interface components, and/or any other suitable components for converting the received data signal from its coupled data channel 115 into a signal that can be used by other components of the receiver system 110. Each CDR subsystem 130 can implement any suitable CDR functionality, such as that of an at-rate CDR (e.g., a Muller-Mueller CDR, baud-rate, CDR, or the like). For example, each CDR subsystem 130 can seek to recover clocking information from its respective received data signal to find an optimal sampling location for reconstructing digital bit data (i.e., data 150) from the received signal.

The equalizer subsystem 140 include a novel type of fast direct feedback decision feedback equalizer (FDF-DFE) 145, and can also include a linear equalizer, a feed-forward equalizer (FFE), and/or any other suitable equalization components. In general, a DFE is a non-linear equalizer that seeks to eliminate inter-symbol interference between pulses currently being modulated and subsequent pulses by feeding back information about previous detector decisions. As described herein, implementations of the FDF-DFE 145 can effectively provide benefits of certain conventional DFE approaches (e.g., conventional direct feedback and loop-unrolled DFEs), while avoiding limitations of those conventional approaches.

Figure 2A:
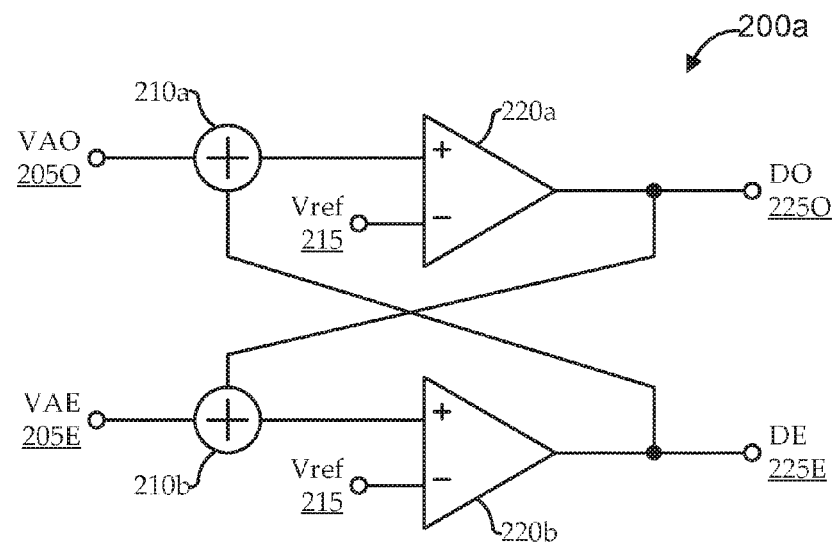
FIGS. 2A and 2B show simplified block diagrams of illustrative conventional direct feedback decision feedback equalizers (DFEs)
Figure 2B:
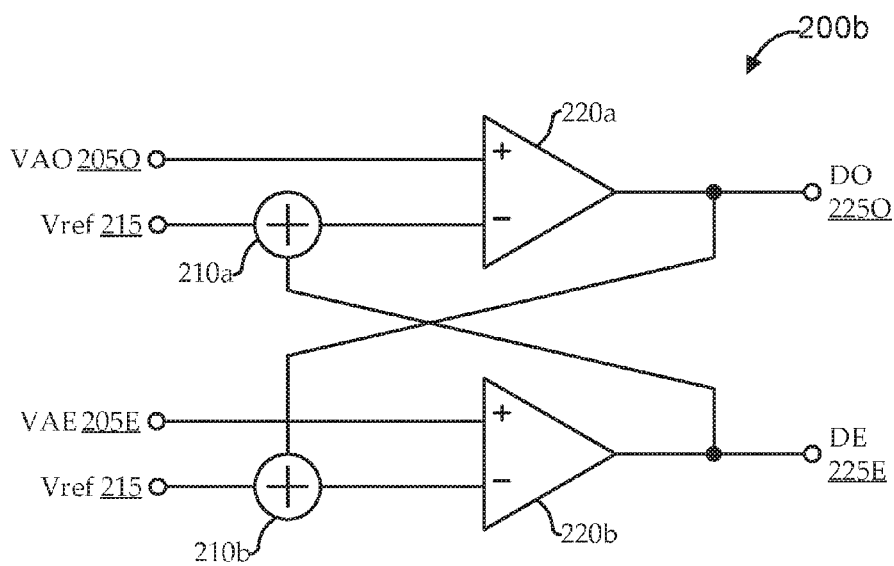
Figure 3:
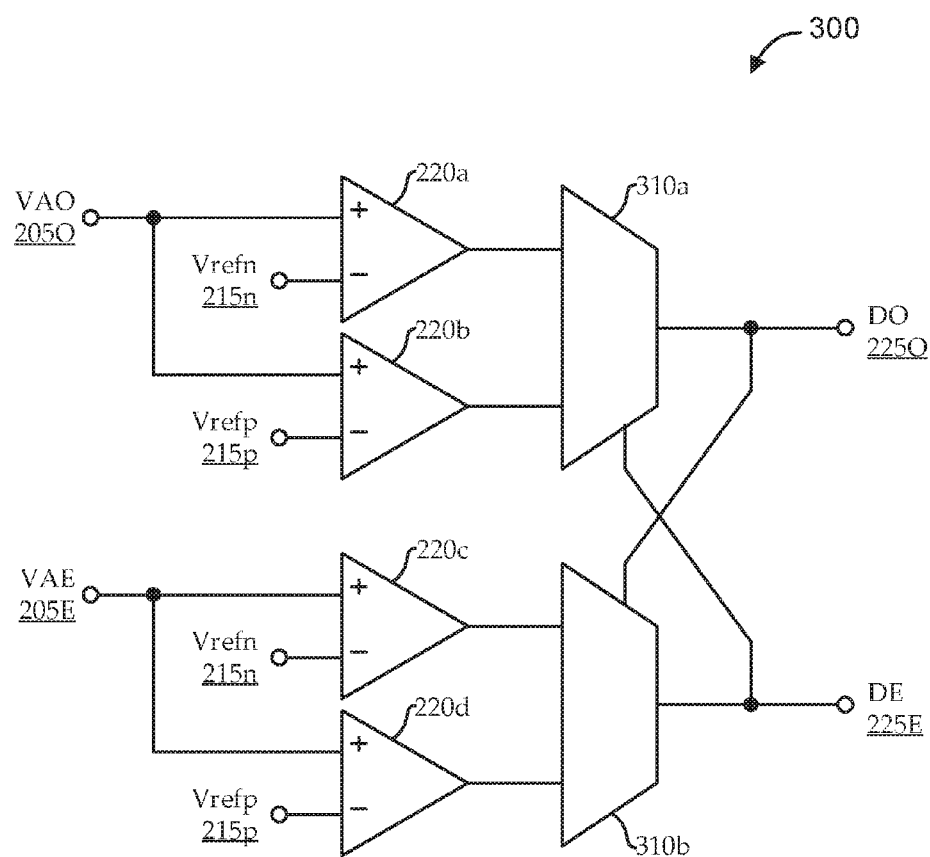
FIG. 3 shows a simplified block diagram of an illustrative conventional "loop-unrolled" DFE.

For the sake of context, FIGS. 2A, 2B, and 3 show various conventional DFE approaches. Each DFE approach is illustrated as having an odd data slicer and an even data slicer. Conceptually, odd-numbered UIs use the odd data slicer, and even-numbered UIs use the even data slicer, such that each data slicer is used in every other UI. For example, a decision made by the odd data slicer in UI1 can be fed back to the even data slicer for use in making a decision in UI2, and so on. As used herein, "odd" and "even" are intended generally as any suitable designation, and other implementations can use different designations, different numbers of data slicers, etc.

FIG. 2A shows a simplified block diagram of an illustrative conventional direct feedback DFE 200a. The conventional direct feedback DFE 200a includes an odd data slicer and an even data slicer. Each data slicer includes a summer 210 and a comparator 220. In an odd UI (e.g., UI1), the odd data slicer receives an odd input data signal (VAO 205O) and adjusts VAO 205O by summer 210a according to an even decision feedback signal (DE 225E) computed in the previous UI (e.g., UI0). The resulting signal is compared (by comparator 220a) to a reference signal (Vref 215), thereby generating an odd decision feedback signal (DO 225O). In a next UI (e.g., UI2), the even data slicer receives an even input data signal (VAE 205E) and adjusts VAE 205E by summer 210b according to the odd decision feedback signal (DO 225O) computed in the previous UI (e.g., UI1, as described above). The resulting signal is compared (by comparator 220b) to a reference signal (e.g., Vref 215), thereby updating the even decision feedback signal (DE 225E) for use in a next UI (e.g., UI3). In this way, the decision made in each UI is directly fed back for use in the next UI.

FIG. 2B shows a simplified block diagram of another illustrative conventional direct feedback DFE 200b. DFE 200b of FIG. 2B is similar to DFE 200a of FIG. 2A, except that the summers 210 are in the reference signal path, instead of in the input data signal path. In an odd UI (e.g., UI1), the odd data slicer receives reference signal (Vref 215) and adjusts Vref 215 by summer 210a according to even decision feedback signal (DE 225E) computed in the previous UI (e.g., UI0). The resulting signal is compared (by comparator 220a) to odd input data signal (VAO 205O), thereby generating odd decision feedback signal (DO 225O). In a next UI (e.g., UI2), the even data slicer receives reference signal (Vref 215) and adjusts Vref 215 by summer 210b according to odd decision feedback signal (DO 225O) computed in the previous UI (e.g., UI1, as described above). The resulting signal is compared (by comparator 220b) to even input data signal (VAE 205E), thereby updating even decision feedback signal (DE 225E) for use in a next UI (e.g., UI3). In this way, as in FIG. 2A, the decision made in each UI is directly fed back for use in the next UI.

Typically, in both types of conventional direct feedback DFE 200, the summers 210 are implemented as a summing circuit (e.g., a push-pull circuit) that includes resistance and capacitance, manifesting a resistive-capacitive (RC) network. The RC time constant of the RC network can adds appreciable latency to the feedback of the decision in each UI. While such a latency can be manageable in some slower data channels, the latency can be too long for effective implementation in high-speed serial links (i.e., when the UI duration is too small relative to the RC time constant). Accordingly, such direct feedback DFE approaches tend to be impractical for high-speed serial link implementations.

FIG. 3 shows a simplified block diagram of an illustrative conventional "loop-unrolled" DFE 300. Generally, loop unrolled DFEs 300 use pre-computation to avoid the latency of a direct feedback DFE (such as those of FIGS. 2A and 2B), but implementing such precomputation can involve additional circuitry (e.g., around twice the circuitry), which can consume appreciably more power and area. The conventional loop unrolled DFE 300 includes an odd data slicer and an even data slicer. Each data slicer includes two comparators 220 and a multiplexer. Conceptually, in each UI, one of the two comparators 220 of the active data slicer (e.g., 220a or 220c) precomputes a decision assuming the previous decision is '1', and the other of the two comparators 220 of the active data slicer (e.g., 220b or 220d) precomputes a decision assuming the previous decision is '0'. The multiplexer can then select which of the two decisions to use once the previous decision becomes available. For example, the first comparator (220a or 220c) compares its respective input data signal 205 to a negative reference signal Vrefn 215n, which can be generated according to one or more DFE tap values (e.g., −H1, or Vcm-H1, where H1 is generated according to a first ISI magnitude of the data channel over which the input data signal 205 is received, and Vcm is a common-mode voltage signal); and the second comparator (220b or 220d) compares its respective input data signal 205 to a negative reference signal Vrefp 215p, which can be generated according to the one or more DFE tap values (e.g., +H1, or Vcm+H1). The outputs of the comparators 220 of each data slicer are coupled to the inputs of a multiplexer 310 of the data slicer, which can select which to use as the data slicer decision. The selection is made according to the previous decision (the output of the multiplexer 310 of the other data slicer in the preceding UI).

Like the conventional direct feedback DFEs 200 described above, the loop-unrolled DFE 300 uses decision feedback from one UI to cancel out ISI in one or more subsequent UIs. In contrast to the conventional direct feedback DFEs 200, the loop-unrolled DFE 300 does not include summers, thereby avoiding the latency caused by the RC time constant. While the reduced latency can permit implementation of the loop-unrolled DFE 300 in higher data rate links, the loop unrolling is realized by using additional circuitry (including an extra comparator in each data slicer), which can appreciably increase power and area consumption of the DFE.

Figure 4:
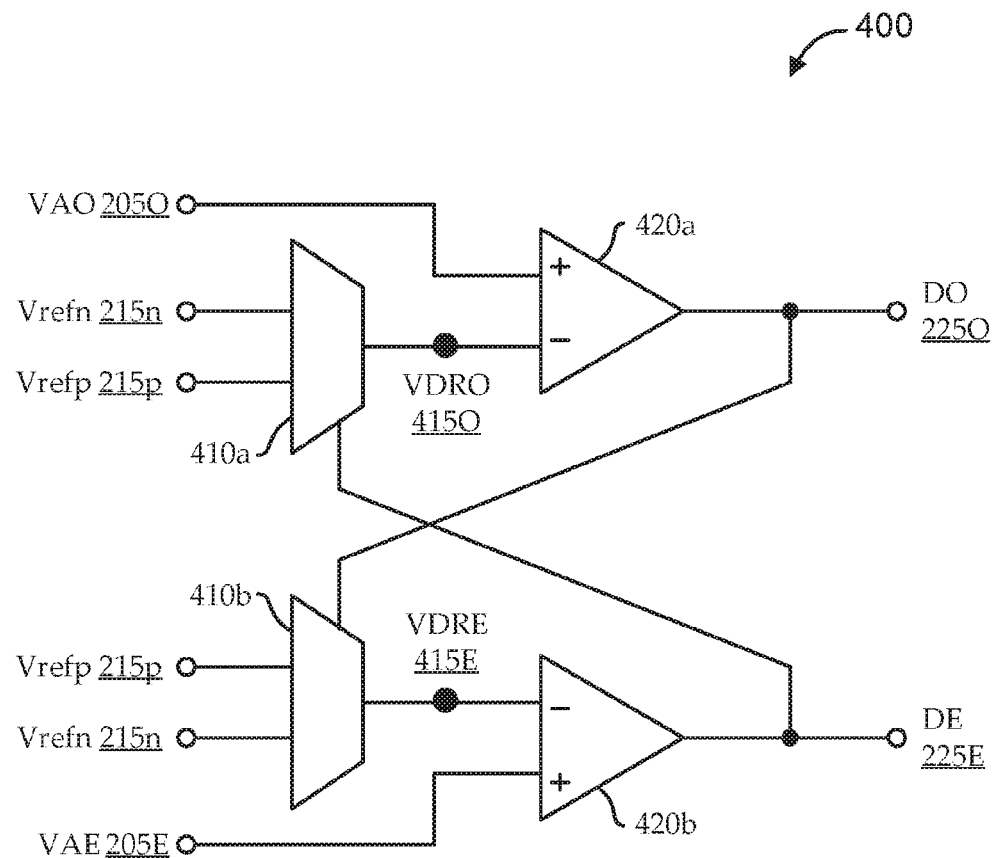
FIG. 4 shows a simplified block diagram of an illustrative fast-direct-feedback DFE (FDF-DFE), according to various embodiments.

FIG. 4 shows a simplified block diagram of an illustrative fast-direct-feedback DFE (FDF-DFE) 400, according to various embodiments. As with the conventional DFE implementations described above, the illustrated FDF-DFE 400 includes an odd data slicer and an even data slicer. Each data slicer includes a multiplexer 410 and a single comparator 220. Conceptually, in each UI, embodiments of the FDF-DFE 400 can compare an analog input data signal (VA) 205 with a decision reference signal (VDR) 415 to update a decision signal 225. The VDR 415 is either a negative reference signal (Vrefn) 215n or a positive reference signal (Vrefp) 215p, selected (e.g., by a multiplexer 410) according to a previous decision signal 225. As illustrated, in an odd UI (e.g., UI1), the odd data slicer receives an odd input data signal (VAO 205O), Vrefn 215n, and Vrefp 215p. Vrefn 215n and Vrefp 215p can be generated according to one or more DFE tap values (e.g., ±H1, or Vcm±H1, where H1 is generated according to a first ISI magnitude of the data channel over which the input data signals 205 are received, and Vcm is a common-mode voltage signal). The multiplexer 410a of the odd data slicer outputs an odd VDR 415O by selecting between Vrefn 215n and Vrefp 215p according to an even decision feedback signal (DE 225E) computed in the previous UI (e.g., UI0) by the even data slicer. The comparator 420a of the odd data slicer outputs (updates) an odd decision feedback signal (DO 225O) by comparing the VAO 205O with the odd VDR 415O. In a next UI (e.g., UI2), the even data slicer receives an even input data signal (VAE 205E), Vrefn 215n, and Vrefp 215p. The multiplexer 410b of the even data slicer outputs an even VDR 415E by selecting between Vrefn 215n and Vrefp 215p according to the DO 225O computed in the previous UI (e.g., UI1) by the odd data slicer, as described above. The comparator 420b of the odd data slicer outputs (updates) the even decision feedback signal (DE 225E) by comparing the VAE 205O with the even VDR 415E.

Figure 5:
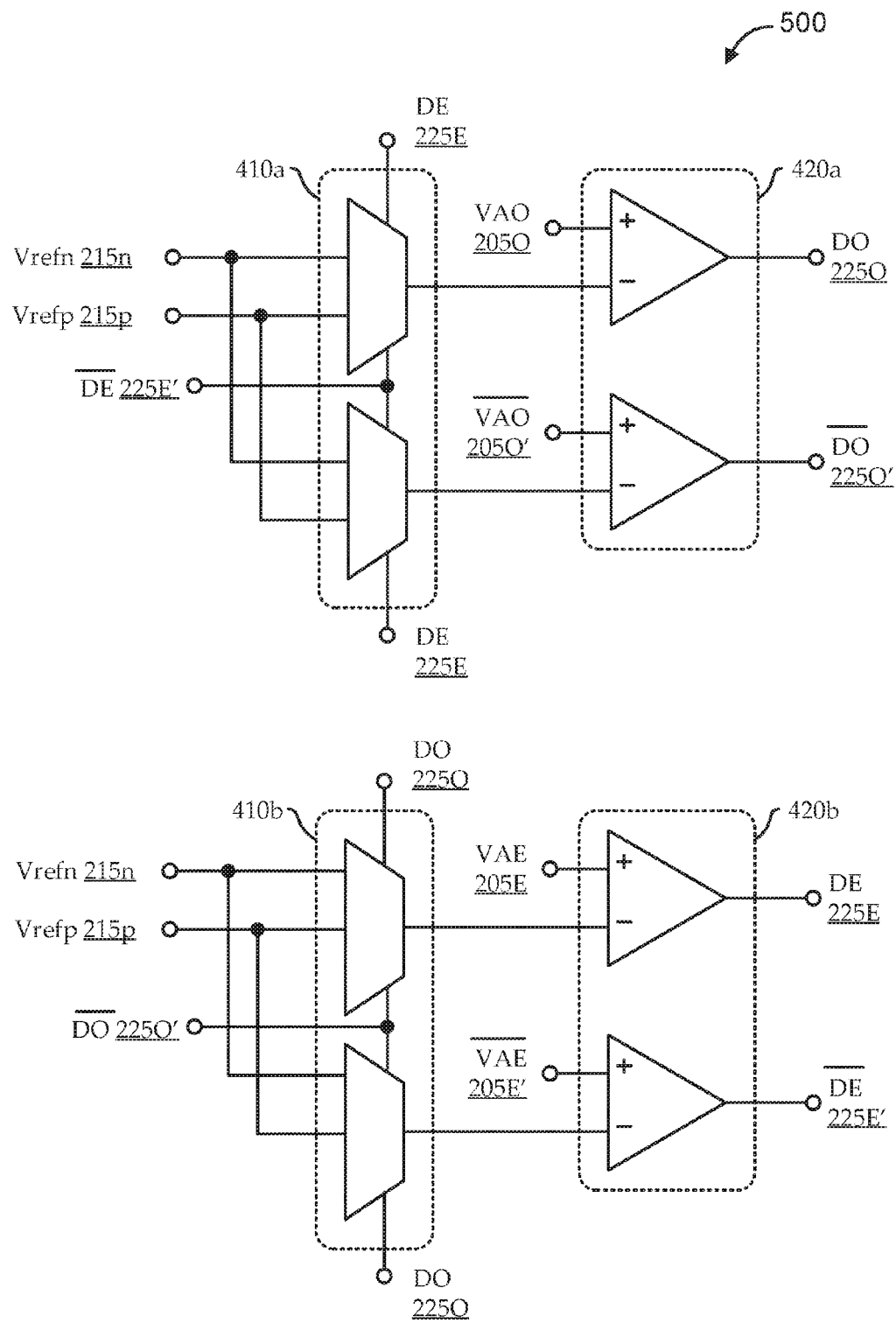
FIG. 5 shows a simplified block diagram of an illustrative common-mode implementation of a FDF-DFE, according to various embodiments.

FIG. 5 shows a simplified block diagram of an illustrative common-mode implementation of a fast-direct-feedback DFE (FDF-DFE) 500, according to various embodiments. Operation of the common-mode FDF-DFE 500 is similar to that of the FDF-DFE 400 described with reference to FIG. 4, except that, to support common-mode operation, each data slicer includes complementary sub-slicers that receive and output complementary signals. As used herein in the common-mode context, a "signal" (S) can be a common-mode voltage reference (Vcm) plus the signal level, and its "complement" ($\overline{S}$) can be Vcm minus the signal level. For example, in the odd data slicer, one odd sub-slicer updates an odd decision DO 225O by selecting an odd VDR 415O (from between a Vrefn 215n and a Vrefp 215p) according to a previously computed even decision DE 225E and its complement $\overline{DE}$ 225E', and comparing an odd input data signal (VAO 205O) with the selected odd VDR 415O. The other odd sub-slicer updates a complementary odd decision ($\overline{DO}$) 225O' by selecting a complementary odd VDR ($\overline{VDRO}$) 415O' according to a previously computed complementary even decision ($\overline{DE}$) 225E', and comparing a complementary odd input data signal ($\overline{VAO}$) 205O' with the selected $\overline{VDRO}$ 415O'.

Figure 6:
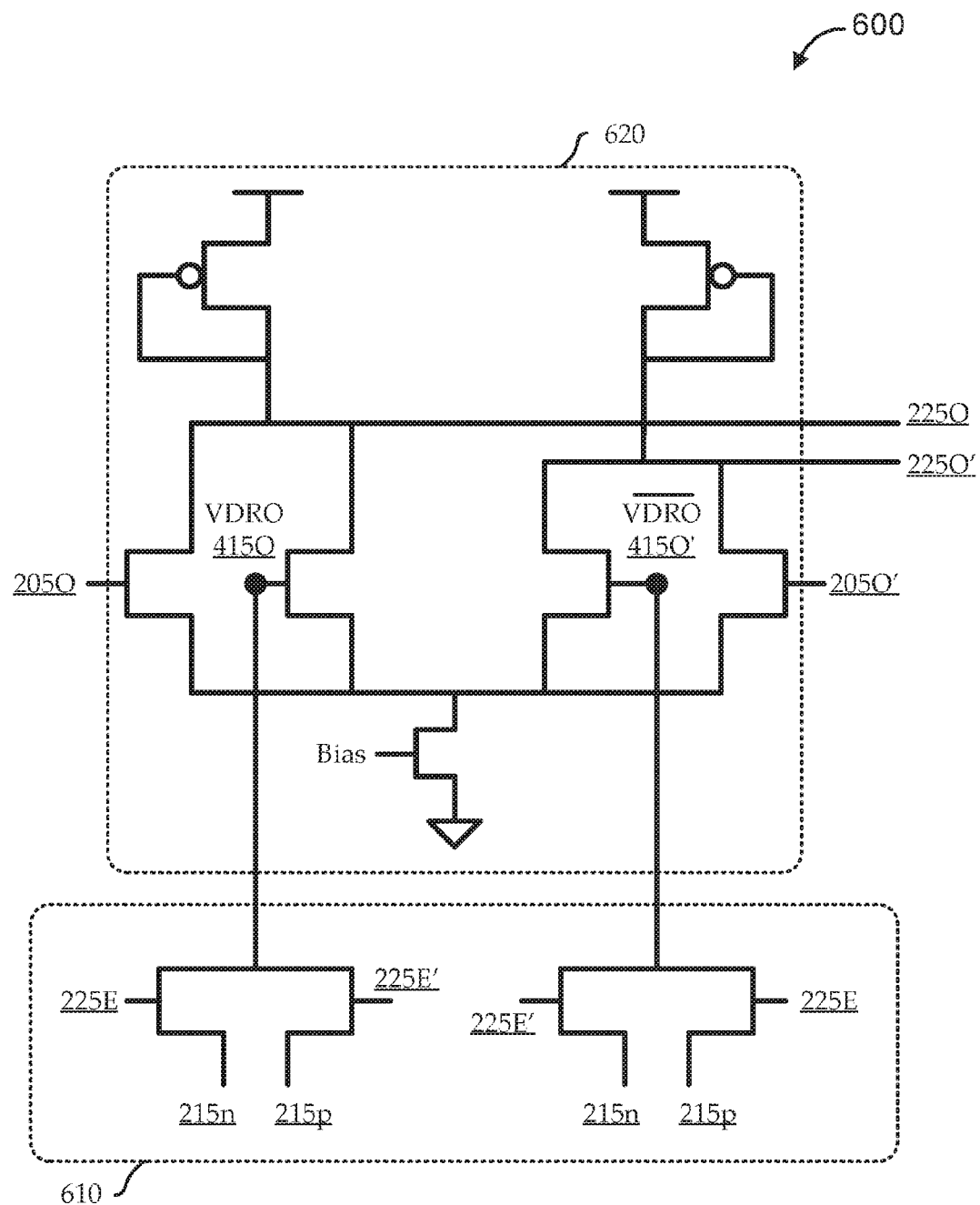
FIG. 6 shows a circuit diagram of an illustrative odd data slicer of a common-mode FDF-DFE, according to various embodiments.

FIG. 6 shows a circuit diagram of an illustrative odd data slicer 600 of a common-mode FDF-DFE, according to various embodiments. The odd data slicer 600 can be an implementation of the odd data slicer shown in context of the common-mode FDF-DFE 500 of FIG. 5. The circuit of the odd data slicer 600 is annotated to show the portion of the circuit implementing a multiplexer circuit 610, and the portion of the circuit implementing a comparator circuit 620. These annotations are intended only to add clarity, and should not be construed as implying strict assignment of certain circuit components to certain functions. As illustrated, each side of the multiplexer circuit 610 effectively selects between a Vrefn 215n and a Vrefp 215p according to differential inputs coupled with a previously computed even decision DE 225E and its complement DE 225E'. The different inputs are flipped on the two sides of the multiplexer circuit 610, so that a first side of the multiplexer circuit 610 selects the odd decision reference signal (VDRO 415O), and a second side of the multiplexer circuit 610 selects the complement of the odd decision reference signals ($\overline{VDRO}$ 415O'). On a first side of the comparator circuit 620, an analog odd input data signal (VAO 205O) is compared with the VDRO 415O selected by the first side of the multiplexer circuit 610, thereby updating the odd decision DO 225O output. On a second side of the comparator circuit 620, the complement of the analog odd input data signal ($\overline{VAO}$ 205O') is compared with the VDRO 415O' selected by the second side of the multiplexer circuit 610, thereby updating the complement of the odd decision $\overline{DO}$ 225O' output. Other circuit components are shown for additional clarity. For example, a gain of the comparator circuit 620 can be adjusted by adjusting a bias voltage, as illustrated.

Figure 7:
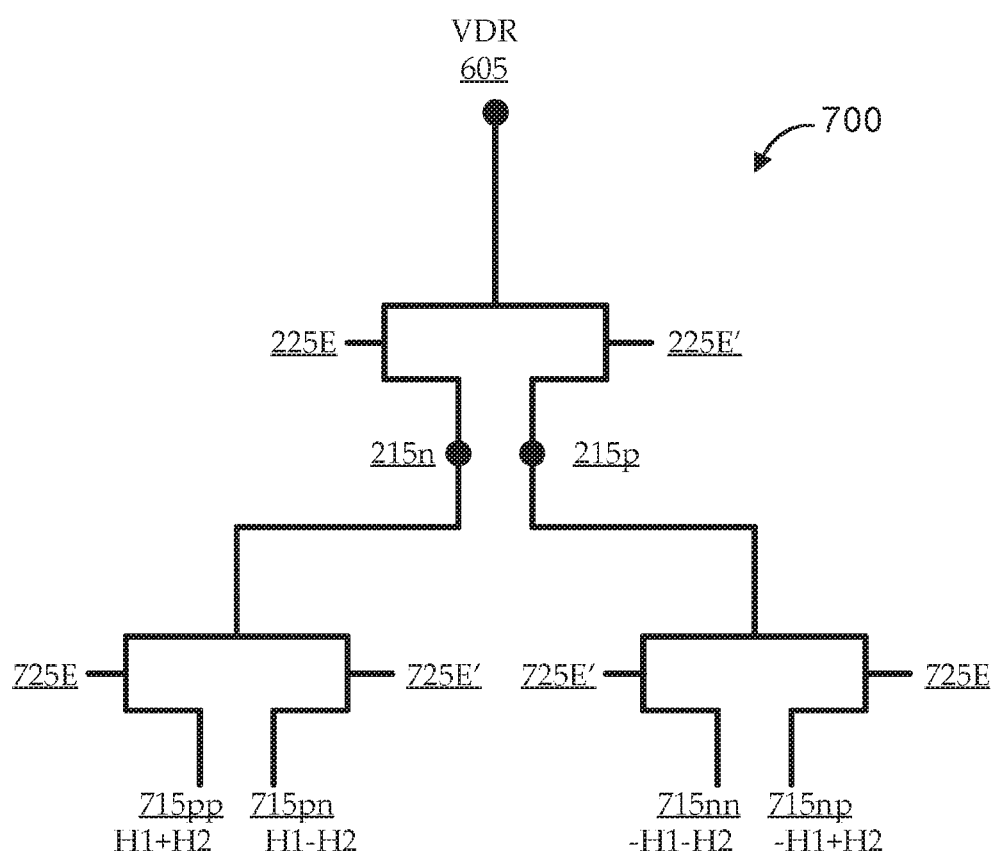
FIG. 7 shows a circuit diagram of additional multiplexer circuitry of an illustrative odd data slicer of a common-mode FDF-DFE, according to various embodiments.

The odd data slicer 600 of FIG. 6 shows selection between Vrefn 215n and Vrefp 215p as driving the decision in each UI. As described above, in some such common-mode implementations, Vrefn 215n can be Vcm−H1, and Vrefp 215p can be Vcm+H1. Implementing the FDF-DFE in this manner can effectively generate decisions based only on a first DFE tap value (H1) and/or otherwise on a magnitude of signal interference from previous data going through a channel. In some applications, however, it is desirable to adapt to the data channel according to additional DFE taps, or the like. FIG. 7 shows a circuit diagram of additional multiplexer circuitry 700 of an illustrative odd data slicer 600 of a common-mode FDF-DFE, according to various embodiments. The additional multiplexer circuitry 700 can permit adaptation of a DFE to a data channel based on a first two (first- and second-order) DFE tap values, H1 and H2, which can be generated according to ISI magnitudes of the data channel. The illustrated multiplexer circuitry 700 comparator circuit 620 can be an implementation of one side of the comparator circuit 600 of FIG. 6. As shown, the two DFE tap values can be used to generate four reference inputs for selection: input 715pp (H1+H2), input 715pn (H1−H2), input 715np (−H1+H2), and input 715nn (−H1−H2). A first sub-multiplexer can generate Vrefn 215n by selecting between input 715pp and input 715pn, according to differential inputs coupled with a previously computed even decision DE 225E and its complement $\overline{DE}$ 225E'. A second sub-multiplexer can generate Vrefp 215p by selecting between input 715np and input 715nn, according to differential inputs coupled with DE 225E and $\overline{DE}$ 225E'. As described with reference to FIG. 6, the remaining portion of the multiplexer circuit 700 can operate as multiplexer circuit 610 by selecting between generated Vrefn 215n and Vrefp 215p according to differential inputs, also coupled with DE 225E and $\overline{DE}$ 225E'. Similar techniques can be used to add taps for feedback, so that the DFE can adapt to its data channel according to higher-order (and/or other) DFE taps, and/or the like. By implementing the H1 and H2 tap feedbacks to have similar timing paths, H2 can have more timing margin.

The various systems, subsystems, and components described above can be implemented in any suitable manner, and the various operations of methods and functions of certain system components can be performed by any suitable means capable of performing the corresponding functions. For example, various functions described with reference to a particular subsystem or component can be performed by a different component, a combination of components, and/or in any other suitable manner. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 8:
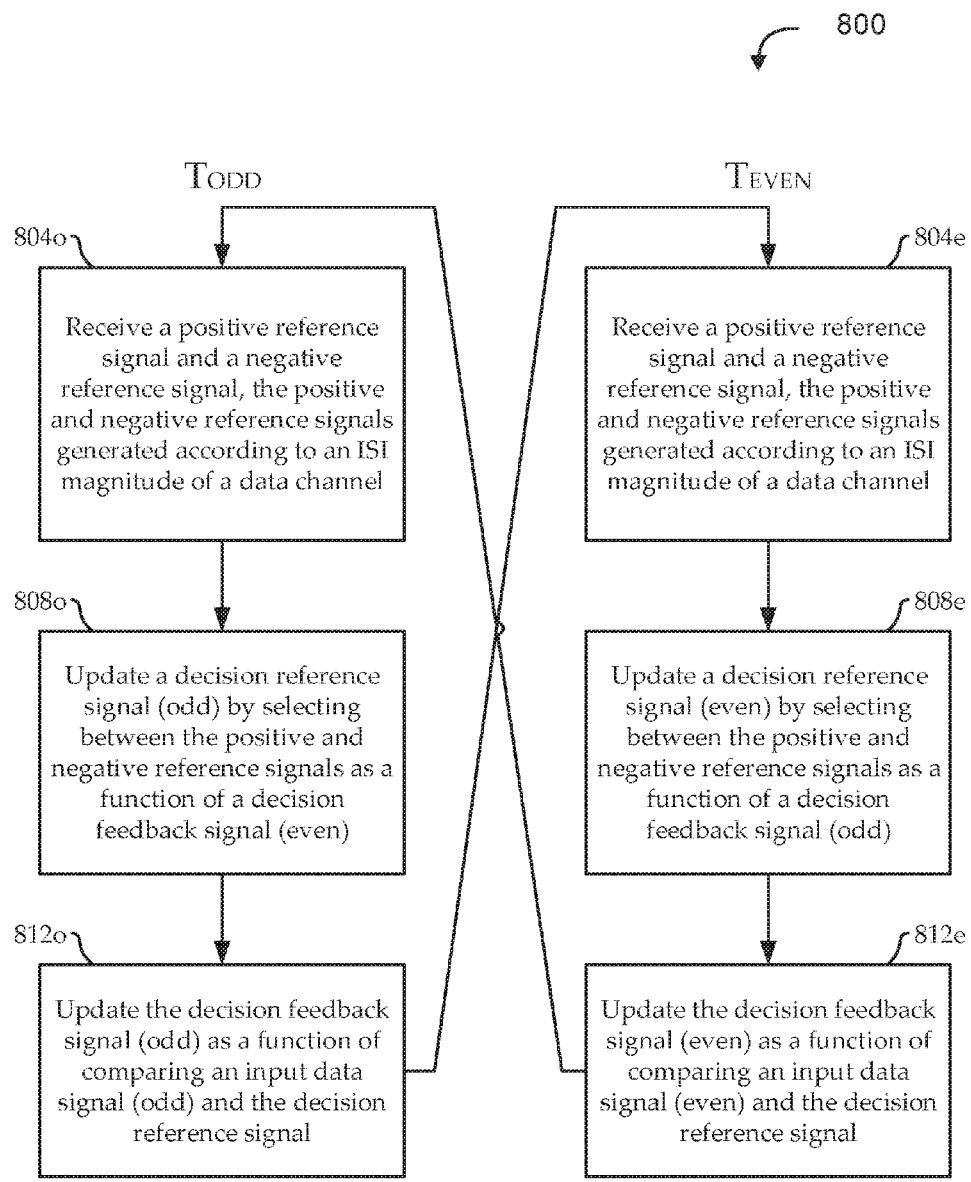
FIG. 8 shows a flow diagram of an illustrative method for direct feedback-based correction of an input data signal, according to various embodiments.

FIG. 8 shows a flow diagram of an illustrative method 800 for direct feedback-based correction of an input data signal, according to various embodiments. For the sake of clarity, an odd UI ($T_{ODD}$) and an even UI ($T_{EVEN}$) are shown. The method can effectively be the same in each UI. Accordingly, in some implementations, each corresponding "even" and "odd" signal can be considered as a same signal. For example, the decision feedback signal can be considered generally as the set of decision feedback signals (including an even decision feedback signal and an odd decision feedback signal), so that updating the decision feedback signal can involve updating the even decision feedback signal and/or the odd decision feedback signal. For example, embodiments of the method 800 can generally begin at stage 804 (i.e., either stage 804o or stage 804e) by receiving a positive reference signal and a negative reference signal, the positive and negative reference signals generated according to an ISI magnitude of a data channel. In some embodiments, the positive reference signal is generated as a common mode reference signal plus the ISI magnitude, and the negative reference signal is generated as the common mode reference signal minus the ISI magnitude. In some such embodiments, the ISI magnitude can correspond to one or more DFE taps, or the like (e.g., H1 only, H1 and H2, etc.).

Embodiments can generally continue at stage 808 (i.e., either stage 808o or stage 808e) by updating a decision reference signal by selecting between the positive and negative reference signals as a function of a decision feedback signal. As described above, in an odd UI (e.g., at stage 808o), the odd decision reference signal is updated by selecting as a function of an even decision feedback signal generated in the preceding even UI; and in an even UI (e.g., at stage 808e), the even decision reference signal is updated by selecting as a function of the odd decision feedback signal generated in the preceding odd UI.

Embodiments can generally continue at stage 812 by updating the decision feedback signal as a function of comparing an input data signal and the decision reference signal updated in stage 808. For example, in an odd UI (at stage 812o), embodiments can update an odd decision feedback signal as a function of comparing an odd input data signal and the odd decision reference signal updated in stage 808o; and in an even UI (at stage 812e), embodiments can update an even decision feedback signal as a function of comparing an even input data signal and the even decision reference signal updated in stage 808e.

Embodiments of FDF-DFEs, including those described above, can provide certain benefits of both conventional direct feedback DFEs and conventional loop-unrolled DFEs, while avoiding limitations of those conventional implementations. For example, instead of waiting for settling of an analog RC circuit, as in conventional direct feedback DFE implementations, FDF-DFE implementations can use a multiplexer (e.g., or any suitable switching or selecting means) to charge or discharge a gate of a comparator circuit, which can have appreciably less latency (faster feedback response time). Further, the FDF-DFE implementations can move the multiplexer to an earlier stage, thereby avoiding the type of pre-calculation of conventional loop-unrolled DFEs. This can provide a number of features, including avoiding the additional comparator circuitry of the loop-unrolled DFEs (thereby reducing area and power), reducing the load to the multiplexer input (e.g., cut in half), speeding up the multiplexer response by permitting a small-swing signal (as opposed to the full-swing signal in the loo-unrolled implementation), etc.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for decision feedback equalization, the system comprising:
   a multiplexer subsystem having:
      a positive reference signal input;
      a negative reference signal input;
      a decision feedback signal input; and
      a decision reference signal output,
   wherein the decision reference signal output is a function of selecting between the positive reference signal input and the negative reference signal input as a function of the decision feedback signal input; and
   a comparator subsystem having:
      a decision reference signal input coupled with the decision reference signal output;
      a data signal input; and
      a decision feedback signal output coupled with the decision feedback signal input,
   wherein the decision feedback signal output is a function of comparing the data signal input and the decision reference signal input.

2. The system of claim 1, further comprising:
   a first error slicer comprising a first instance of the multiplexer subsystem and a first instance of the comparator subsystem; and
   a second error slicer comprising a second instance of the multiplexer subsystem and a second instance of the comparator subsystem.

3. The system of claim 2, wherein:
   the decision reference signal input of the first instance of the comparator subsystem is coupled with an even decision reference signal output;
   the decision feedback signal output of the first instance of the comparator subsystem is coupled with an even decision feedback signal input;
   the decision reference signal input of the second instance of the comparator subsystem is coupled with an odd decision reference signal output;
   the decision feedback signal output of the second instance of the comparator subsystem is coupled with an odd decision feedback signal input;
   the decision feedback signal input of the first instance of the multiplexer subsystem is the odd decision feedback signal input;
   the decision reference signal output of the first instance of the multiplexer subsystem is the even decision reference signal output;
   the decision feedback signal input of the second instance of the multiplexer subsystem is the even decision feedback signal input; and
   the decision reference signal output of the second instance of the multiplexer subsystem is the odd decision reference signal output.

4. The system of claim 1, wherein:
   the positive and negative reference signals are generated according to an inter-symbol interference magnitude for a data channel.

5. The system of claim 1, wherein:
   the positive and negative reference signals are generated according to a first history bit (H1) corresponding to inter-symbol interference magnitude for a data channel and a second history bit (H2) corresponding to the inter-symbol interference magnitude for the data channel, such that:
   the positive reference signal is generated by selecting, as a function of the decision feedback signal input, between a first input generated according to H1+H2 and a second input generated according to H1−H2; and
   the negative reference signal is generated by selecting, as a function of the decision feedback signal input, between a third input generated according to −H1+H2 and a fourth input generated according to −H1−H2.

6. The system of claim 1, wherein:
   the positive reference signal input and the negative reference signal input are complementary and are generated further according to a common mode voltage level.

7. The system of claim 1, wherein:
   the decision feedback signal output of the comparator subsystem is a differential output; and
   the decision feedback signal input is a differential input coupled with the differential output.

8. The system of claim 1, further comprising:
   a receiver system coupled with a high-speed serial data link, the receiver system comprising the multiplexer subsystem and the comparator subsystem.

9. A method for direct feedback-based correction of an input data signal, the method comprising:
   receiving a positive reference signal and a negative reference signal, the positive and negative reference signals generated according to an inter-symbol interference magnitude for a data channel;
   updating a decision reference signal by selecting between the positive and negative reference signals as a function of a decision feedback signal; and
   updating the decision feedback signal as a function of comparing an input data signal and the decision reference signal.

10. The method of claim 9, wherein:
    the decision feedback signal comprises an even decision feedback signal and an odd decision feedback signal;
    updating the decision reference signal comprises:
       in a first time interval, selecting between the positive and negative reference signals as a function of the even decision feedback signal; and
       in a second time interval adjacent to the first time interval, selecting between the positive and negative reference signals as a function of the odd decision feedback signal; and updating the decision feedback signal comprises:
       in the first time interval, updating the odd decision feedback signal as a function of comparing the input data signal and the decision reference signal; and
       in the second time interval, updating the even decision feedback signal as a function of comparing the input data signal and the decision reference signal.

11. The method of claim 9, wherein:
    the positive reference signal is generated as a common mode reference signal plus the inter-symbol interference magnitude for the data channel; and
    the negative reference signal is generated as the common mode reference signal minus the inter-symbol interference magnitude for the data channel.

12. The method of claim 9, wherein:
    the positive and negative reference signals are generated according to a first history bit (H1) corresponding to the inter-symbol interference magnitude for the data channel and a second history bit (H2) corresponding to the inter-symbol interference magnitude for the data channel, such that:
the positive reference signal is generated by selecting, as a function of the decision feedback signal input, between a first input generated according to H1+H2 and a second input generated according to H1−H2; and
the negative reference signal is generated by selecting, as a function of the decision feedback signal input, between a third input generated according to −H1+H2 and a fourth input generated according to −H1−H2.

13. The method of claim 9, wherein the decision feedback signal is a differential signal.

14. A system for direct feedback-based correction of an input data signal, the system comprising:
means for updating a decision reference signal in a present unit time interval ($UI_N$) by selecting between a positive reference signal and a negative reference signal as a function of a decision feedback signal updated in a preceding unit time interval ($UI_{N-1}$), where N is a positive integer; and
means for updating the decision feedback signal in $UI_N$ as a function of comparing the decision reference signal and an input data signal received in $UI_N$.

15. The system of claim 14, wherein:
the decision feedback signal comprises an even decision feedback signal and an odd decision feedback signal;
the decision feedback signal updated in $UI_{N-1}$ is the even decision feedback signal; and
the decision feedback signal updated in $UI_N$ is the odd decision feedback signal.

16. The system of claim 14, further comprising:
means for generating the positive and negative reference signals according to an inter-symbol interference magnitude for a data channel over which the input data signal is received.

17. The system of claim 14, further comprising:
means for generating the positive and negative reference signals according to a first history bit (H1) corresponding to inter-symbol interference magnitude for a data channel and a second history bit (H2) corresponding to the inter-symbol interference magnitude for the data channel, such that:
the positive reference signal is generated by selecting, as a function of the decision feedback signal input, between a first input generated according to H1+H2 and a second input generated according to H1−H2; and
the negative reference signal is generated by selecting, as a function of the decision feedback signal input, between a third input generated according to −H1+H2 and a fourth input generated according to −H1−H2.

18. The system of claim 14, further comprising:
means for generating the positive reference signal input and the negative reference signal input as complementary signals according to a common mode voltage level.

19. The system of claim 14, wherein the decision feedback signal is a differential signal.

20. The system of claim 14, further comprising:
means for receiving the input data signal via a high-speed serial data link, the means for receiving comprising the means for updating the decision reference signal and the means for updating the decision feedback signal.

* * * * *

UNITED STATES PATENT AND TRADEMARK OFFICE
CERTIFICATE OF CORRECTION

PATENT NO. : 9,806,918 B1
APPLICATION NO. : 15/181167
DATED : October 31, 2017
INVENTOR(S) : Su et al.

It is certified that error appears in the above-identified patent and that said Letters Patent is hereby corrected as shown below:

In the Specification

In Column 2, Line 15, delete "input:" and insert -- input; --, therefor.

In Column 2, Line 15, delete "input:" and insert -- input; --, therefor.

In Column 2, Line 32, delete "channel:" and insert -- channel; --, therefor.

In Column 2, Line 59, delete "embodiments:" and insert -- embodiments; --, therefor.

In Column 2, Line 64, delete "DFE:" and insert -- DFE; --, therefor.

In Column 2, Line 67, delete "embodiments:" and insert -- embodiments; --, therefor.

In Column 3, Line 3, delete "embodiments:" and insert -- embodiments; --, therefor.

In Column 3, Line 6, delete "embodiments:" and insert -- embodiments; --, therefor.

In Column 9, Line 38, delete "8080)," and insert -- 808o), --, therefor.

Signed and Sealed this
Twenty-sixth Day of June, 2018

Andrei Iancu
*Director of the United States Patent and Trademark Office*